(12) United States Patent
Ohata et al.

(10) Patent No.: US 8,933,354 B2
(45) Date of Patent: Jan. 13, 2015

(54) ELECTRONIC DEVICE

(75) Inventors: Naohiro Ohata, Sakai (JP); Nobuyuki Kitamura, Osaka (JP)

(73) Assignee: KYOCERA Corporation, Kyoto (JP)

( * ) Notice: Subject to any disclaimer, the term of this patent is extended or adjusted under 35 U.S.C. 154(b) by 297 days.

(21) Appl. No.: 13/634,236

(22) PCT Filed: Mar. 23, 2011

(86) PCT No.: PCT/JP2011/056922
§ 371 (c)(1),
(2), (4) Date: Sep. 11, 2012

(87) PCT Pub. No.: WO2011/118609
PCT Pub. Date: Sep. 29, 2011

(65) Prior Publication Data
US 2013/0001055 A1    Jan. 3, 2013

(30) Foreign Application Priority Data

Mar. 25, 2010 (JP) .................................. 2010-070449

(51) Int. Cl.
*H01H 9/04* (2006.01)
*H01H 25/00* (2006.01)
(Continued)

(52) U.S. Cl.
CPC .............. *H04M 1/0237* (2013.01); *H04M 1/18* (2013.01); *H04M 1/233* (2013.01); *H01H 9/04* (2013.01); *H01H 25/002* (2013.01); *H01H 2009/048* (2013.01)
USPC ........................................ 200/293; 455/575.1

(58) Field of Classification Search
CPC ....... H01H 25/04; H01H 25/00; H01H 13/02; H01H 21/06; H01H 21/04; H01H 9/04
USPC .......... 200/1 R, 5 R, 6 A, 6 R, 17 R, 18, 293, 200/302.2, 302.3; 455/575.1
See application file for complete search history.

(56) References Cited

U.S. PATENT DOCUMENTS 6,777,632 B1  8/2004  Tamaki et al.
6,956,180 B1 * 10/2005  Su et al. ..................... 200/302.3
(Continued)

FOREIGN PATENT DOCUMENTS

JP    S61-071924 U    5/1986
JP    2003-289186 A   10/2003
(Continued)

OTHER PUBLICATIONS

International Search Report dated Jun. 28, 2011, issued for International Application No. PCT/JP2011/056922.

*Primary Examiner* — Amy Cohen Johnson
*Assistant Examiner* — Marina Fishman
(74) *Attorney, Agent, or Firm* — Procopio, Cory, Hargreaves & Savitch LLP (57) ABSTRACT

An electronic device in which a waterproof structure is formed without hindering a lever operation to a lever switch is provided. A device main body has a housing member in which an opening is provided to house a switch main body, and a cover member that is engaged to the housing member to form at least a part of the front surface of the device main body, and the device main body has an elastic sheet arranged at a rear surface side of the cover member to cover the opening of the housing member, having a shape extending to a position overlapping with engaging surfaces between the housing member and the cover member, and having an outer edge portion interposed between the engaging surfaces of the housing member and the cover member, and a bottomed cylindrical portion that projects from a front surface of the elastic sheet.

5 Claims, 9 Drawing Sheets (51) Int. Cl.
*H04M 1/02* (2006.01)
*H04M 1/18* (2006.01)
*H04M 1/23* (2006.01)

(56) References Cited

U.S. PATENT DOCUMENTS

8,255,019 B2 * 8/2012 Hayashi et al. ............ 455/575.1
8,768,422 B2 * 7/2014 Kitamura .................. 455/575.4
2006/0065511 A1   3/2006 Yamasaki et al.
2008/0302641 A1 * 12/2008 Su .............................. 200/302.3
2013/0005409 A1 * 1/2013 Okamoto et al. .......... 455/575.1

FOREIGN PATENT DOCUMENTS

| JP | 2004-288459 A | 10/2004 |
| JP | 2006-100084 A | 4/2006 |
| JP | 2008-277034 A | 11/2008 |
| WO | 02/31848 A1 | 4/2002 |

* cited by examiner

ELECTRONIC DEVICE

TECHNICAL FIELD

The present invention relates to an electronic device such as a mobile phone including a lever switch.

BACKGROUND ART

In an electronic device of this type, a lever switch is arranged in a device main body, and the lever switch includes a switch main body and a lever portion that can perform a lever operation in many directions with reference to the switch main body. In the front surface of the device main body, a window to expose the lever portion of the lever switch is formed (for example, see Patent Document 1).

PRIOR ART DOCUMENT

Patent Document

Patent Document 1: Japanese Patent Laid-open Publication No. 2008-277034

SUMMARY OF THE INVENTION

Problems to be Solved by the Invention

In recent years, an electronic device is desired to have a waterproof structure. As the waterproof structure, an opening such as a window formed in the device main body may be configured to be covered with a waterproof member such as a waterproof sheet or a waterproof rubber. However, when the configuration is applied to the electronic device having the lever switch, the lever portion is covered with the waterproof member. As a result, the lever operation of the lever switch is hindered by the waterproof member. For this reason, in the past, the electronic device having the lever switch is difficult to have a waterproof structure.

It is an object of the present invention to provide an electronic device having a waterproof structure that suppresses a lever operation from being hindered by a lever switch.

Means for Solving the Problems

An electronic device according to the present invention includes:
 a device main body; and
 a lever switch arranged in the device main body,
 the lever switch being configured by
 a switch main body, and
 a lever portion that can perform a lever operation in at least one direction with reference to the switch main body, and
 a window that exposes the lever portion of the lever switch on a front surface of the device main body being provided in the device main body, wherein
 the device main body has
 a housing member in which an opening is provided to house the switch main body of the lever switch, and
 a cover member that is engaged to the housing member to form at least a part of the front surface of the device main body,
 the window is provided in the cover member, and
 the device main body has
 an elastic sheet arranged at a rear surface side of the cover member to cover the opening of the housing member, having a shape extending to a position overlapping with engaging surfaces between the housing member and the cover member, and having an outer edge portion interposed between the engaging surfaces of the housing member and the cover member, and
 a bottomed cylindrical portion that projects from a front surface of the elastic sheet, into which at least a distal end portion of the lever portion of the lever switch is inserted.

As the elastic sheet, a sheet-like elastic member having a waterproof property can be used.

In the electronic device, even when water comes from the window of the cover member into the rear surface side of the cover member, the water does not easily pass through the elastic sheet. Thus, the water that has come thereinto accumulates on the front surface of the elastic sheet or moves along the front surface of the elastic sheet. At this time, the outer edge portion of the elastic sheet is interposed between the engaging surfaces of the housing member and the cover member. Thus, even when the water that has come thereinto moves on the front surface of the elastic sheet toward the engaging surface, the water is suppressed from moving to the rear surface of the elastic sheet by the outer edge portion of the elastic sheet. The water is also suppressed from coming from the outside of the device main body through a portion between the engaging surfaces of the housing member and the cover member into the device main body by the outer edge portion of the elastic sheet interposed between the engaging surfaces. Thus, the water can be prevented from coming from the outside of the device main body into the opening in which the lever switch is housed. That is, the electronic device has a waterproof structure that prevents water from coming into the opening in which the lever switch is housed.

Furthermore, in the electronic device, since the bottomed cylindrical portion projects from the front surface of the elastic sheet, an operating physical force can be applied from the front surface side of the elastic sheet to the bottomed cylindrical portion in various directions. When the operating physical force is applied to the bottomed cylindrical portion, the lever portion of the lever switch is moved in an operating direction together with the bottomed cylindrical portion. Thus, the lever operation to the lever switch can be suppressed from being hindered by the elastic sheet.

Effects of the Invention

According to the electronic device of the present invention, the lever operation can be suppressed from being hindered by the lever switch.

DETAILED DESCRIPTION OF EMBODIMENTS

An embodiment in which the present invention is applied to a sliding-type mobile phone will be concretely described below with reference to the accompanying drawings.

Figure 1:
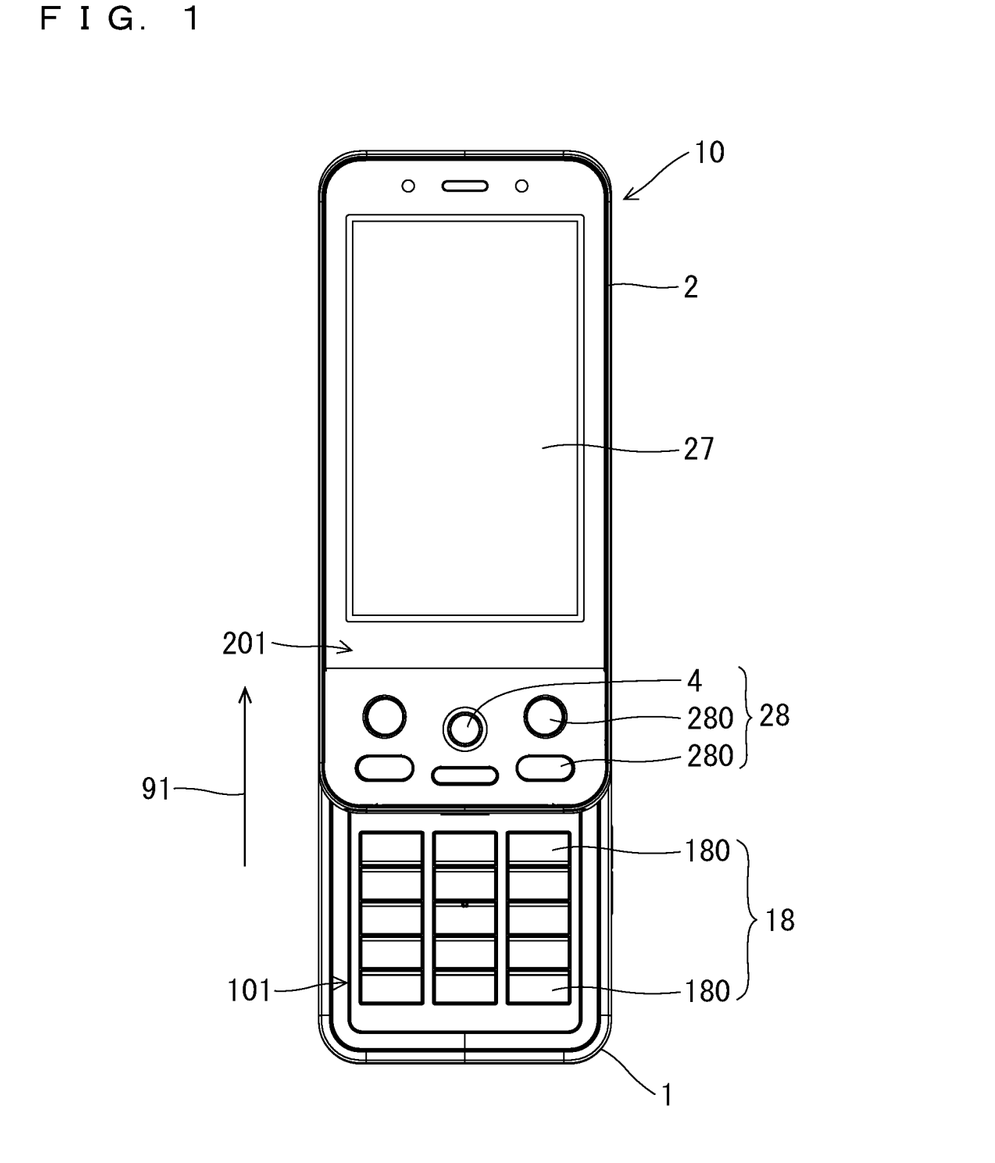
FIG. 1 is a front view showing a sliding-type mobile phone according to an embodiment of the present invention.

FIG. 1 is a front view showing a sliding-type mobile phone according to an embodiment of the present invention. As shown in FIG. 1, the sliding-type mobile phone includes a device main body 10 configured by slidably connecting a first cabinet 1 to second cabinet 2. On a front surface 101 of the first cabinet 1, a first operation portion 18 configured by a plurality of operation keys 180 to 180 is arranged.

A display portion configured by a liquid crystal display panel 27 is installed on a front surface 201 of the second cabinet 2. On the other hand, a second operation portion 28 configured by a lever switch 4 and a plurality of operation keys 280 to 280 is arranged in the second cabinet 2. On a front surface 201 of the second cabinet 2, in a region different from an installation region of the liquid crystal display panel 27, a part of the second operation portion 28, i.e., an operator (first key top 43 (described later)) of the lever switch 4 and an operator (second key top 282 (described later)) of each of the operation keys 280 are exposed.

Figure 2:
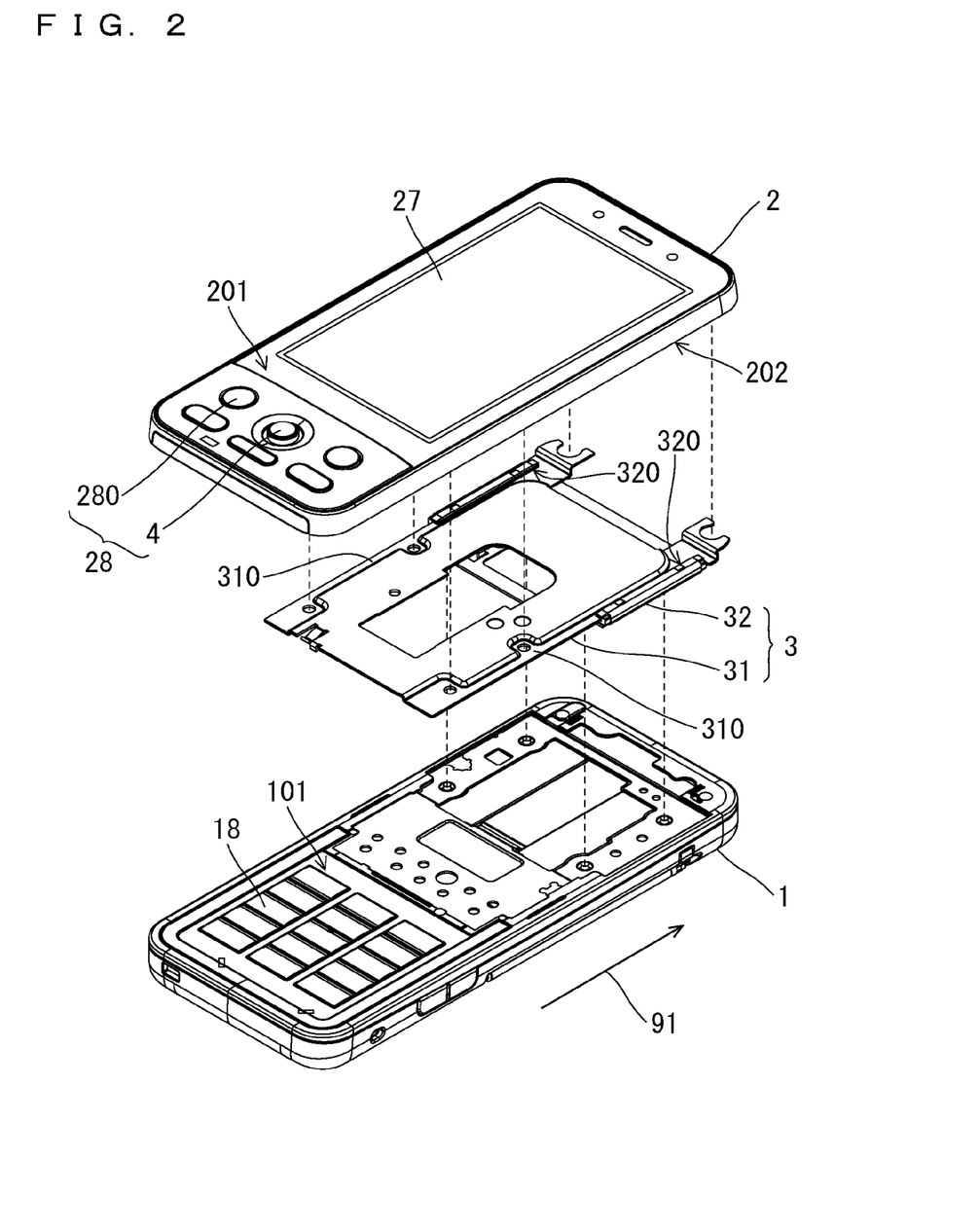
FIG. 2 is an exploded perspective view of the sliding-type mobile phone.

FIG. 2 is an exploded perspective view of the sliding-type mobile phone. As shown in FIG. 2, a sliding mechanism 3 that slidably connects the first cabinet 1 and the second cabinet 2 to each other is arranged therebetween, and the sliding mechanism 3 is configured by a slide body 31 and a slide regulating portion 32. The slide body 31 is fixed to one counter-facing surface (i.e., a rear surface 202 of the second cabinet 2) at the side of the second cabinet 2 out of counter-facing surfaces between the first cabinet 1 and the second cabinet 2. On the other hand, the slide regulating portion 32 is fixed to another counter-facing surface (i.e., the front surface 101 of the first cabinet 1) at the side of the first cabinet 1 out of the counter-facing surfaces between the first cabinet 1 and the second cabinet 2, more specifically, fixed to a region different from the installation region of the first operation portion 18.

Further, on both the end positions of the slide regulating portion 32 are formed one pair of left and right guide hooks 320, 320, with which left and right edge portions 310, 310 of the slide body 31 are slidably engaged. In this manner, the slide regulating portion 32 regulates the sliding direction of the slide body 31 to a longitudinal direction 91 of the first cabinet 1.

Figure 3:
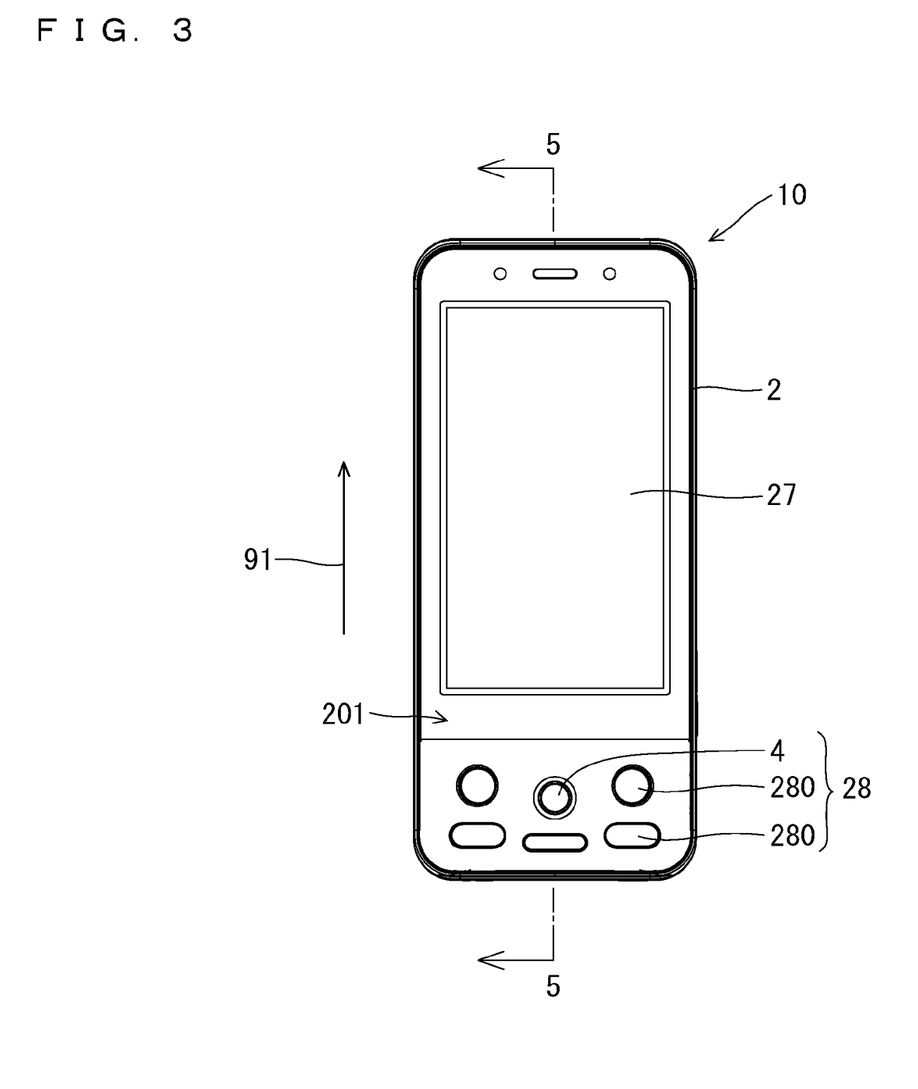
FIG. 3 is a front view used in a description of a closed state of a device main body of the sliding-type mobile phone.

For this reason, the device main body 10 of the sliding-type mobile phone relatively moves the first cabinet 1 with respect to the second cabinet 2 in the sliding direction to make it possible to change a state between a closed state in which both the cabinets 1,2 are closed as shown in FIG. 3 such that the entire area of the first operation portion 18 is covered with the second cabinet 2 and an open state in which both the cabinets 1,2 are opened as shown in FIG. 1 such that the entire area of the first operation portion 18 is exposed.

A user of the sliding-type mobile phone can operate the sliding-type mobile phone by using the first operation portion 18 and the second operation portion 28 when the device main body 10 is set to the open state as shown in FIG. 1. As shown in FIG. 3, even when the device main body 10 is set to the closed state, the user can operate the sliding-type mobile phone by using the second operation portion 28.

Figure 4:
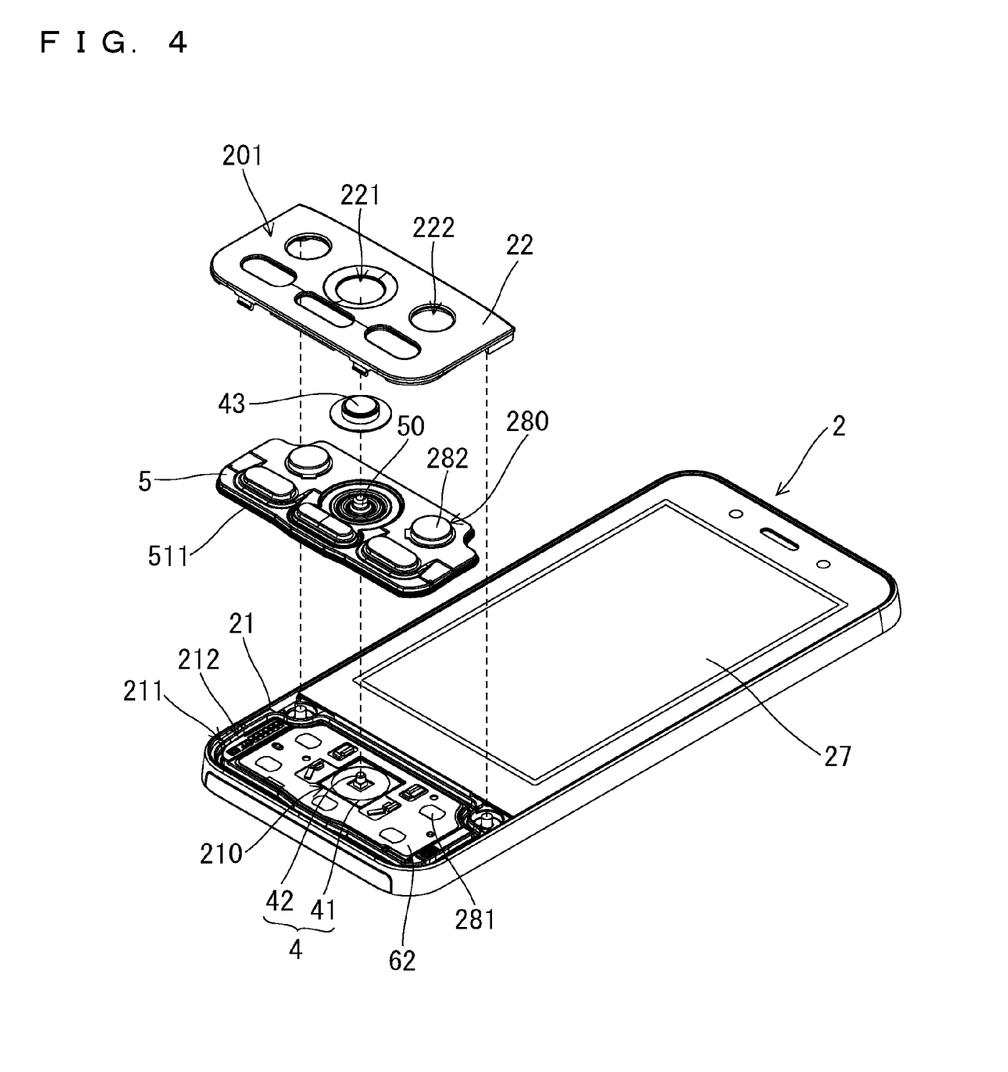
FIG. 4 is an exploded perspective view of a second cabinet configuring the device main body.
Figure 5:
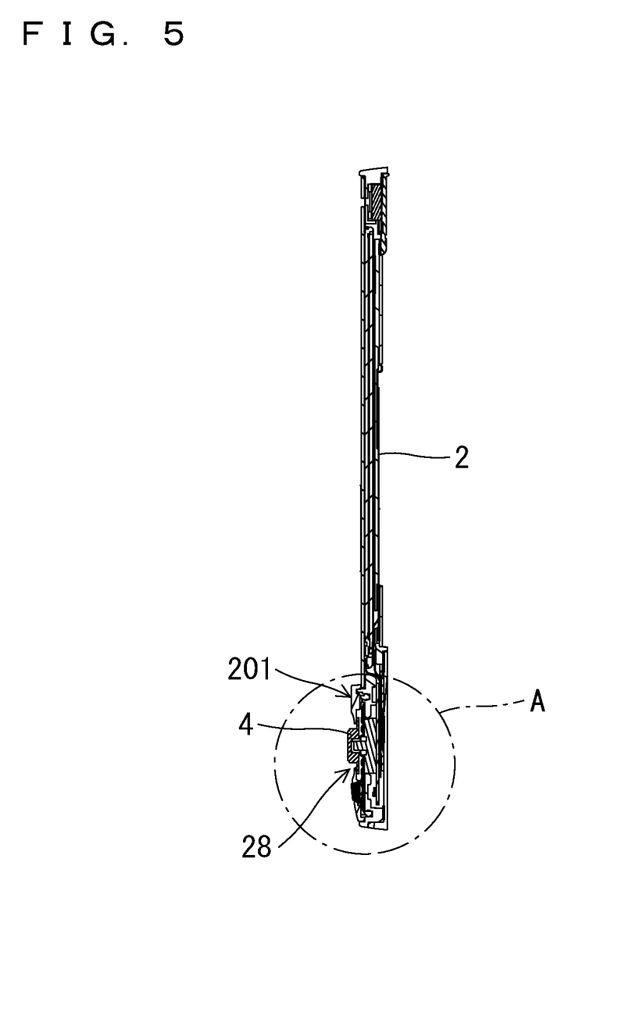
FIG. 5 is a sectional view of a second cabinet along a 5-5 line shown in FIG. 3.
Figure 6:
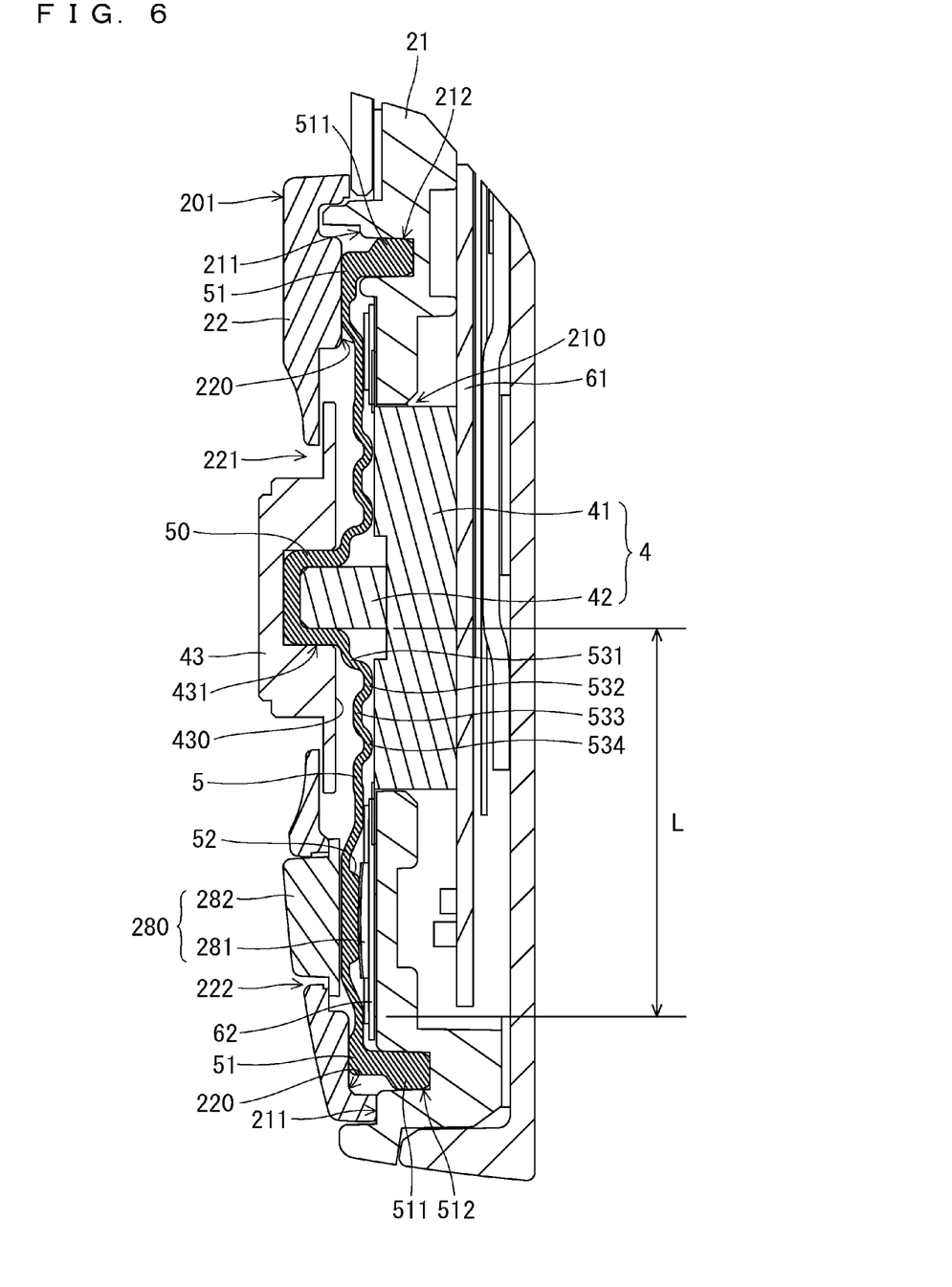
FIG. 6 is an enlarged view of an A region shown in FIG. 5.

FIG. 4 is an exploded perspective view of the second cabinet 2. FIG. 5 is a sectional view of the second cabinet 2 along a 5-5 line shown in FIG. 3, and FIG. 6 is an enlarged view of an A region shown in FIG. 5. As shown in FIGS. 4 and 6, the lever switch 4 includes a rectangular switch main body 41 and a lever portion 42 projecting from the switch main body 41. The lever switch 4 according to the embodiment can perform a lever operation such that the lever portion 42 is slid in a total of eight directions including four vertical and horizontal directions and their four oblique directions with reference to the switch main body 41, and a lever operation that depresses the lever portion 42 toward the switch main body 41. The lever switch 4 is mounted on a first substrate 61 arranged in the second cabinet 2.

The second cabinet 2 has a chassis 21 made of a magnesium alloy and a cover member 22 that is engaged to the chassis 21 to partially form the front surface 201 of the second cabinet 2. In a region of the chassis 21 covered with the cover member 22, a square opening 210 that houses the switch main body 41 of the lever switch 4 is formed. Thus, the chassis 21 is used as a constituent member configuring the second cabinet 2, and is used as a housing member in which the opening 210 housing the switch main body 41 of the lever switch 4 is formed.

As shown in FIG. 6, the first substrate 61 is arranged at a rear surface side of the chassis 21, and the switch main body 41 of the lever switch 4 mounted on the first substrate 61 is inserted from the rear surface side of the chassis 21 into the opening 210 of the chassis 21. The switch main body 41 is fitted in the opening 210 of the chassis 21.

As shown in FIGS. 4 and 6, in the region of the chassis 21 covered with the cover member 22, a sheet-like second substrate 62 spreading to surround the opening 210 of the chassis 21 is installed, and on the front surface of the second substrate 62, a dome switch 281 configuring the operation keys 280 is mounted.

Furthermore, in the region of the chassis 21 covered with the cover member 22, an engaging surface 211 that spreads to surround the installation region of the second substrate 62 and to which the cover member 22 should be engaged is formed. In the engaging surface 211, an annular groove 212 extending to surround the installation region of the second substrate 62 is concavely formed.

As shown in FIGS. 4 and 6, at a rear surface side of the cover member 22, a waterproof rubber 5 that covers the opening 210 of the chassis 21 and the second substrate 62 is arranged. In this case, the waterproof rubber 5 is of an elastic sheet having a waterproof property. In place of the waterproof rubber 5, various elastic sheets having a waterproof property may be employed.

The waterproof rubber 5 has a shape extending to a position overlapping with the engaging surface 211 of the chassis 21. A seal portion 511 to be fitted into the annular groove 212 of the chassis 21 is formed to project from an outer edge portion 51 of the waterproof rubber 5 toward the annular groove 212.

Thus, in an assembling state of the second cabinet 2 as shown in FIG. 6, the seal portion 511 of the waterproof rubber 5 is fitted into the annular groove 212 of the chassis 21, and the cover member 22 is engaged to the chassis 21. In this manner, the seal portion 511 is depressed into the annular groove 212 by an engaging surface 220 of the cover member 22. For this reason, the seal portion 511 of the waterproof rubber 5 is fitted into the annular groove 212 without any gap. At this time, the outer edge portion 51 of the waterproof rubber 5 is interposed between the engaging surfaces 211, 220 of the chassis 21 and the cover member 22.

Furthermore, on the waterproof rubber 5, a bottomed cylindrical portion 50 is formed into which a distal end portion of the lever portion 42 of the lever switch 4 is inserted. In this case, the bottomed cylindrical portion 50 opens in a rear surface of the waterproof rubber 5 and projects from a front surface of the waterproof rubber 5. Thus, an operating physical force can be applied from the front surface side of the waterproof rubber 5 to the bottomed cylindrical portion 50 in various directions. When the operating physical force is applied to the bottomed cylindrical portion 50, the lever portion 42 of the lever switch 4 is moved in an operating direction together with the bottomed cylindrical portion 50. Thus, the lever operation to the lever switch 4 can be suppressed from being hindered by the waterproof rubber 5.

On the rear surface of the waterproof rubber 5, a projecting portion 52 is formed in a region opposing each of the dome switches 281. As shown in FIG. 6, in the assembling state of the second cabinet 2, the projecting portion 52 of the waterproof rubber 5 is brought into contact with the dome switch 281. When a depression force is applied to a region of the front surface of the waterproof rubber 5 overlapping with each of the projecting portions 52 at the rear surface side, the depression force is brought through the projecting portion 52 to the dome switch 281 corresponding to the projecting portion 52. As a result, the dome switch 281 is depressed. Thus, the depression operation to the operation key 280 can be suppressed from being hindered by the waterproof rubber 5.

The first key top 43 serving as an operator of the lever switch 4 is fitted on the bottomed cylindrical portion 50 of the waterproof rubber 5. More specifically, a fitting concave portion 431 is formed in a back portion 430 of the first key top 43, and the bottomed cylindrical portion 50 is fitted into the fitting concave portion 431. On the front surface of the waterproof rubber 5, the second key top 282 serving as an operator of the operation key 280 is stuck and fixed to a position overlapping with each of the projecting portions 52 on the rear surface side.

In this case, through the cover member 22, a first window 221 that exposes the first key top 43 of the lever switch 4 on the front surface of the cover member 22 and a second window 222 that exposes the second key top 282 of each of the operation keys 280 on the front surface of the cover member 22 are formed. Thus, a user of the sliding-type mobile phone can execute a lever operation to the lever switch 4 by applying an operating physical force to the first key top 43, and can execute a depression operation to the operation key 280 corresponding to the second key top 282 by applying an operating physical force to each of the second key tops 282.

Figure 7:
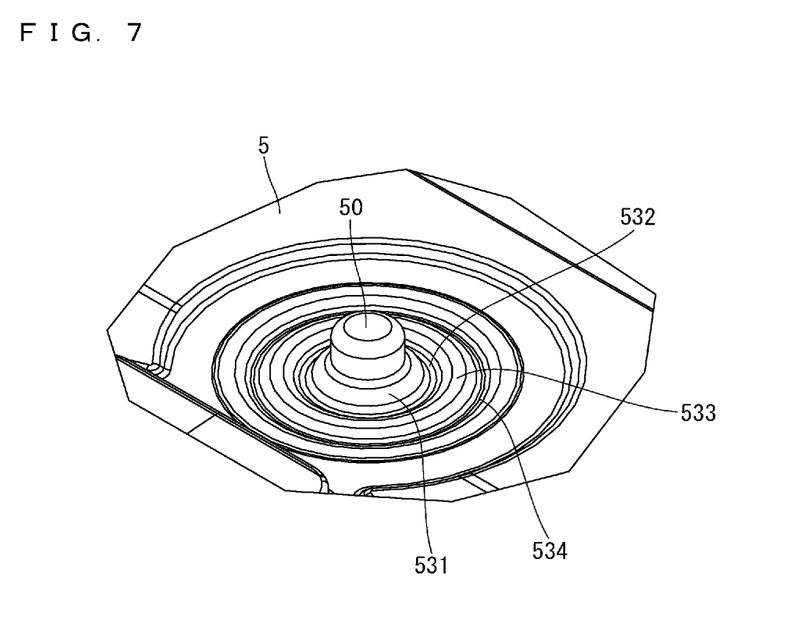
FIG. 7 is an enlarged view showing a peripheral region of a bottomed cylindrical portion with regard to a waterproof rubber included in the sliding-type mobile phone.

FIG. 7 is an enlarged view showing a peripheral region of the bottomed cylindrical portion 50 with regard to the waterproof rubber 5. As shown in FIG. 7 (also see FIG. 6), in the waterproof rubber 5, a plurality of bent portions 531 to 534 are formed which annularly extend around the bottomed cylindrical portion 50 to surround the bottomed cylindrical portion 50 by bending the waterproof rubber 5 around the bottomed cylindrical portion 50.

More specifically, in the waterproof rubber 5 are formed a first bent portion 531 bent from the bottomed cylindrical portion 50 in the form of a dome, an annular second bent portion 532 extending from the first bent portion 531 to the outside and bulging from the rear surface side of the waterproof rubber 5, an annular third bent portion 533 extending from the second bent portion 532 to the outside and bulging from the front surface side of the waterproof rubber 5, and an annular fourth bent portion 534 extending from the third bent portion 533 to the outside and bulging from the rear surface side of the waterproof rubber 5. In this manner, the waterproof rubber 5 has a region coaxially rippled around the bottomed cylindrical unit 50.

Thus, as shown in FIG. 6, in a direction in which the lever operation to at least the lever portion 42 can be performed, the waterproof rubber 5 has a so-called bellows shape. A length of the waterproof rubber 5 from the bottomed cylindrical portion 50 to the outer edge portion 51 is larger than a distance L from the lever portion 42 to the engaging surface 211 of the chassis 21 by a length of the bent portion of the waterproof rubber 5. In this case, the length of the waterproof rubber 5 is set to be almost equal to or larger than a width in which the lever portion 42 can be slid.

Furthermore, the waterproof rubber 5, as shown in FIG. 6, is shaped such that the bent portions 531 to 534 are spaced apart from the back portion 430 of the first key top 43.

In the sliding-type mobile phone, even when water comes from the first and second windows 221, 222 of the cover member 22 into the rear surface side of the cover member 22, the water does not easily pass through the waterproof rubber 5. Thus, the water that has come thereinto accumulates on the front surface of the waterproof rubber 5 or moves along the front surface of the waterproof rubber 5. In this case, the outer edge portion 51 of the waterproof rubber 5 is interposed between the engaging surfaces 211, 220 of the chassis 21 and the cover member 22, and the seal portion 511 is fitted into the annular groove 212 without any gap. Thus, even when the water that has come thereinto moves on the front surface of the waterproof rubber 5 toward the engaging surfaces 211, 220, the water is suppressed from moving to the rear surface of the waterproof rubber 5 by the outer edge portion 51 and the seal portion 511 of the waterproof rubber 5.

In addition, the water is suppressed from coming from the outside of the device main body 10 through a portion between the engaging surfaces 211, 220 of the chassis 21 and the cover member 22 into the device main body 10 by the outer edge portion 51 of the waterproof rubber 5 interposed between the engaging surfaces 211, 220 and the seal portion 511 fitted into the annular groove 212 without any gap.

Thus, the water outside the device main body 10 does not easily come onto the front surface of the second substrate 62 and into the opening 210 that houses the lever switch 4. That is, the sliding-type mobile phone has a waterproof structure that suppresses water from coming onto the front surface of the second substrate 62 and into the opening 210 that houses the lever switch 4.

Figure 8:
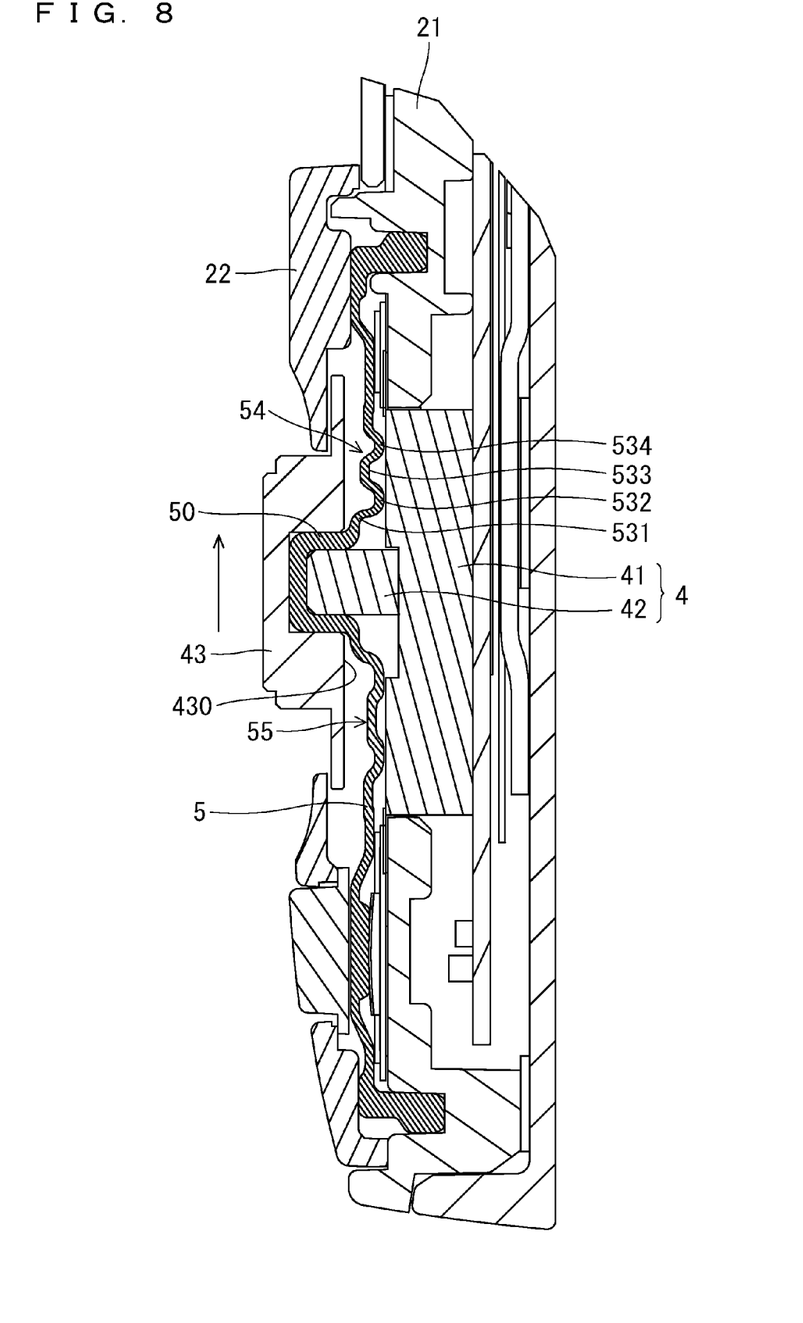
FIG. 8 is a sectional view used in a description of a lever operation to slide the lever portion upward with regard to the lever switch included in the sliding-type mobile phone.

In the sliding-type mobile phone, when an operating physical force is not applied to the bottomed cylindrical portion 50 of the waterproof rubber 5 (when a user does not operate the first key top 43), as shown in FIG. 6, the waterproof rubber 5 has a region coaxially rippled around the bottomed cylindrical portion 50. On the other hand, in order to slide the lever portion 42 of the lever switch 4 upward, when an operating physical force is applied to the bottomed cylindrical portion 50 of the waterproof rubber 5 upward (when a user operates the first key top 43 upward), as shown in FIG. 8, the bottomed cylindrical portion 50 moves in the operating direction (upward). Accordingly, on the waterproof rubber 5, a compression force is imparted to a forward region 54 located in the moving direction of the bottomed cylindrical portion 50 to compress the forward region 54. On the other hand, a tensile force is imparted to a backward region 55 located in a direction opposite to the moving direction of the bottomed cylindrical portion 50 to extend the backward region 55.

In this case, the forward region 54 and the backward region 55 of the waterproof rubber 5 are bent as shown in FIG. 6 even when the compression force or the tensile force is not imparted to the regions. For this reason, the forward region 54 of the waterproof rubber 5 is further bent only by a slight compression force imparted to the region 54. Thus, the forward region 54 is easily compressed. The backward region 55 of the waterproof rubber 5 is extended only by a slight tensile force imparted to the region 55 to decrease the curvature of the region. Thus, the backward region 55 is easily extended. Even when the operating physical force is caused to act on the bottomed cylindrical portion 50 of the waterproof rubber 5 in a vertical, horizontal, or oblique direction, the waterproof rubber 5 deforms as described above.

Figure 9:
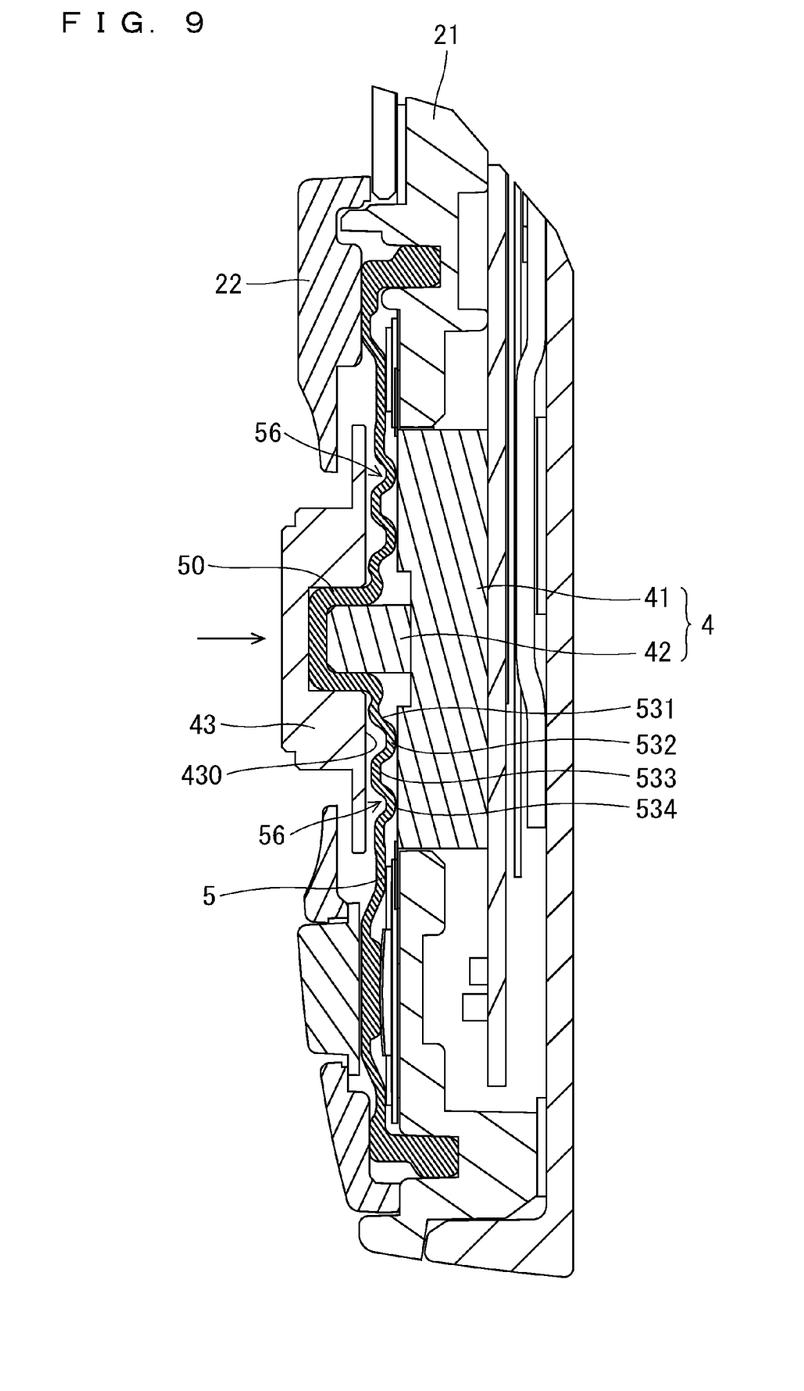
FIG. 9 is a sectional view used in a description of a lever operation to depress the lever portion toward the switch main body with regard to the lever switch included in the sliding-type mobile phone.

In order to depress the lever portion 42 of the lever switch 4 toward the switch main body 41, when depression force is applied to the bottomed cylindrical portion 50 of the waterproof rubber 5 (when a user depresses the first key top 43), as shown in FIG. 9, the bottomed cylindrical portion 50 moves in the depression direction. Accordingly, on the waterproof rubber 5, a compression force is imparted to a peripheral region 56 located around the bottomed cylindrical portion 50 to compress the peripheral region 56 outside.

In this case, the peripheral region 56 of the waterproof rubber 5 is bent as shown in FIG. 6 even when the compression force is not imparted to the peripheral region 56. For this reason, the peripheral region 56 of the waterproof rubber 5 is further bent only by a slight compression force imparted to the region 56. Thus, the peripheral region 56 is easily compressed.

Therefore, according to the sliding-type mobile phone, even in a lever operation to the lever switch 4, the lever portion 42 only receives a small repulsive force from the waterproof rubber 5 in a direction opposite to the operating direction. Thus, the lever operation to the lever switch 4 is not easily hindered by the waterproof rubber 5.

In the sliding-type mobile phone, the bent portions 531 to 534 of the waterproof rubber 5 have a shape that surrounds the bottomed cylindrical portion 50. Thus, a repulsive force which the lever portion 42 receives from the waterproof rubber 5 in the lever operation to the lever switch 4 is very small.

In the sliding-type mobile phone, when the bent portions 531 to 534 are compressed, the heights of the bent portions increase. In this case, when the bent portions 531 to 534 are in contact with the back portion 430 of the first key top 43, the bent portions 531 to 534 are prevented by the first key top 43 from being subjected to deformation that further increases the heights of the bent portions. In contrast to this, in the sliding-type mobile phone according to the embodiment, as shown in FIG. 6, the bent portions 531 to 534 are arranged to be spaced apart from the back portion 430 of the first key top 43. Thus, as shown in FIGS. 8 and 9, the bent portions 531 to 534 are not easily prevented by the first key top 43 from being subjected to deformation that further increases the heights of the bent portions. Thus, a lever operation to the lever switch 4 is not easily prevented by the first key top 43 or the waterproof rubber 5.

The configuration of the components in the present invention is not limited to the above embodiment, and various changes and modifications can be effected without departing from the spirit and scope of the invention. Since the shape of the waterproof rubber 5 as shown in FIGS. 6 and 7 is an example, the waterproof rubber 5 can employ various shapes obtained by bending the waterproof rubber 5 around the bottomed cylindrical portion 50. The shape of each of the bent portions 531 to 534 formed in the waterproof sheet 5 may be not only an annular shape but also a polygonal shape depending on a direction in which the lever operation to the lever portion 42 can be performed.

Furthermore, in the present invention, the waterproof rubber 5 may employ a shape that loosens a region between the bottomed cylindrical portion 50 and the outer edge portion 51 in a state before being assembled. In this case, when the waterproof rubber 5 is fitted on the chassis 21, the loosened region of the waterproof rubber 5 is bent to form the bent portion. As the waterproof rubber 5, a waterproof rubber made of a stretchable material may be employed.

The configurations employed in the sliding-type mobile phone can be applied to various mobile phones such as a foldable mobile phone and a straight type mobile phone. The configurations employed in the sliding-type mobile phone can be applied to not only a mobile phone but also various electronic devices such as a PDA (Personal Digital Assistant), a digital camera and a video camera.

DESCRIPTION OF REFERENCE CHARACTERS

10 Device main body
1 First cabinet
2 Second cabinet
201 Front surface
21 Chassis (housing member)
210 Opening
211 Engaging surface
212 Annular groove
22 Cover member
220 Engaging surface
221 First window
222 Second window
28 Second operation portion
280 Operation key
281 Dome switch
282 Second key top
3 Sliding mechanism
4 Lever switch
41 Switch main body
42 Lever portion
43 First key top
430 Back portion
5 Waterproof rubber (elastic sheet)
50 Bottomed cylindrical portion
51 Outer edge portion
511 Seal portion
52 Projecting portion
531 First bent portion
532 Second bent portion
533 Third bent portion
534 Fourth bent portion
54 Forward region
55 Backward region
56 Peripheral region
61 First substrate
62 Second substrate
L Distance

The invention claimed is:

1. An electronic device comprising:
a device main body; and
a lever switch arranged in the device main body,
the lever switch being configured by
a switch main body, and
a lever portion that can perform a lever operation in at least one direction with reference to the switch main body, and
a window that exposes the lever portion of the lever switch on a front surface of the device main body being provided in the device main body, wherein the device main body has
a housing member in which an opening is provided to house the switch main body of the lever switch, and
a cover member that is engaged to the housing member to form at least a part of the front surface of the device main body,
the window is provided in the cover member, and
the device main body has
an elastic sheet arranged at a rear surface side of the cover member to cover the opening of the housing member, having a shape extending to a position overlapping with engaging surfaces between the housing member and the cover member, and having an outer edge portion interposed between the engaging surfaces of the housing member and the cover member, and
a bottomed cylindrical portion that projects from a front surface of the elastic sheet, into which at least a distal end portion of the lever portion of the lever switch is inserted.

2. The electronic device according to claim 1, wherein the elastic sheet, in a direction in which the lever operation to at least the lever portion can be performed, has a length from the bottomed cylindrical portion to the outer edge portion, the length being longer than a distance from the lever portion to the engaging surface.

3. The electronic device according to claim 2, wherein, in the elastic sheet, the elastic sheet is bent around the bottomed cylindrical portion to provide one or a plurality of bent portions.

4. The electronic device according to claim 3, wherein the bent portion of the elastic sheet has a shape that surrounds the bottomed cylindrical portion.

5. The electronic device according to claim 3, wherein a key top is fitted on the bottomed cylindrical portion of the elastic sheet, and the elastic sheet has a shape in which the bent portion is spaced apart from a back portion of the key top.

* * * * *